United States Patent [19]

LaValley

[11] Patent Number: 4,683,059
[45] Date of Patent: * Jul. 28, 1987

[54] VACUUM BREAKER VALVE-DISCHARGE ELBOW ASSEMBLY FOR ROTARY DRUM FILTERS

[75] Inventor: Richard W. LaValley, Vancouver, Wash.

[73] Assignee: LaValley Industrial Plastics, Inc., Vancouver, Wash.

[*] Notice: The portion of the term of this patent subsequent to Aug. 26, 2003 has been disclaimed.

[21] Appl. No.: 737,824

[22] Filed: May 24, 1985

[51] Int. Cl.$^4$ ............................................. B01D 33/06
[52] U.S. Cl. .................................... 210/404; 210/392; 210/429; 162/321; 162/323; 162/334; 162/357; 162/369; 162/370
[58] Field of Search ............... 162/321, 323, 334, 357, 162/369, 370; 210/217, 392, 402, 403, 404, 429, 430, 784

[56] References Cited

U.S. PATENT DOCUMENTS

| | | | |
|---|---|---|---|
| Re. 27,326 | 4/1972 | Sheaffer | 210/404 |
| 915,436 | 3/1909 | Hencke | 210/404 |
| 2,052,156 | 8/1936 | Young | 210/404 |
| 2,220,322 | 11/1940 | Evans | 210/392 |
| 2,416,073 | 2/1947 | Smely | 210/392 |
| 3,363,774 | 5/1965 | Luthi | 210/404 |
| 3,452,874 | 7/1969 | Keller | 210/404 |
| 3,630,380 | 12/1971 | Barnedi | 210/404 |
| 4,056,475 | 11/1977 | Sander | 210/402 |
| 4,154,687 | 5/1979 | LaValley | 210/404 |
| 4,383,877 | 5/1983 | LaValley | 210/404 |
| 4,419,165 | 12/1983 | LaValley | 210/404 |

Primary Examiner—Ernest G. Therkorn
Attorney, Agent, or Firm—Marger & Johnson

[57] ABSTRACT

A rotary drum filter of the pipe machine type has a stationary vacuum breaker valve-discharge elbow assembly at the discharge end of the drum which defines a streamlined, smoothly curving, and substantially unobstructed discharge flow passage with gradually changing flow cross sectional areas. The valve member includes a valve closure segment at its inlet end that is structurally connected to the annular outlet end flange and sealing rim by an extension segment which forms a continuation of the valve segment. The cross sectional shapes and areas of the flow passage at the valve outlet and discharge elbow inlet are the same, but the area gradually increases in a direction toward the outlet of the elbow, and the shape gradually changes from a segmented circle to a full circle in the same direction.

30 Claims, 7 Drawing Figures

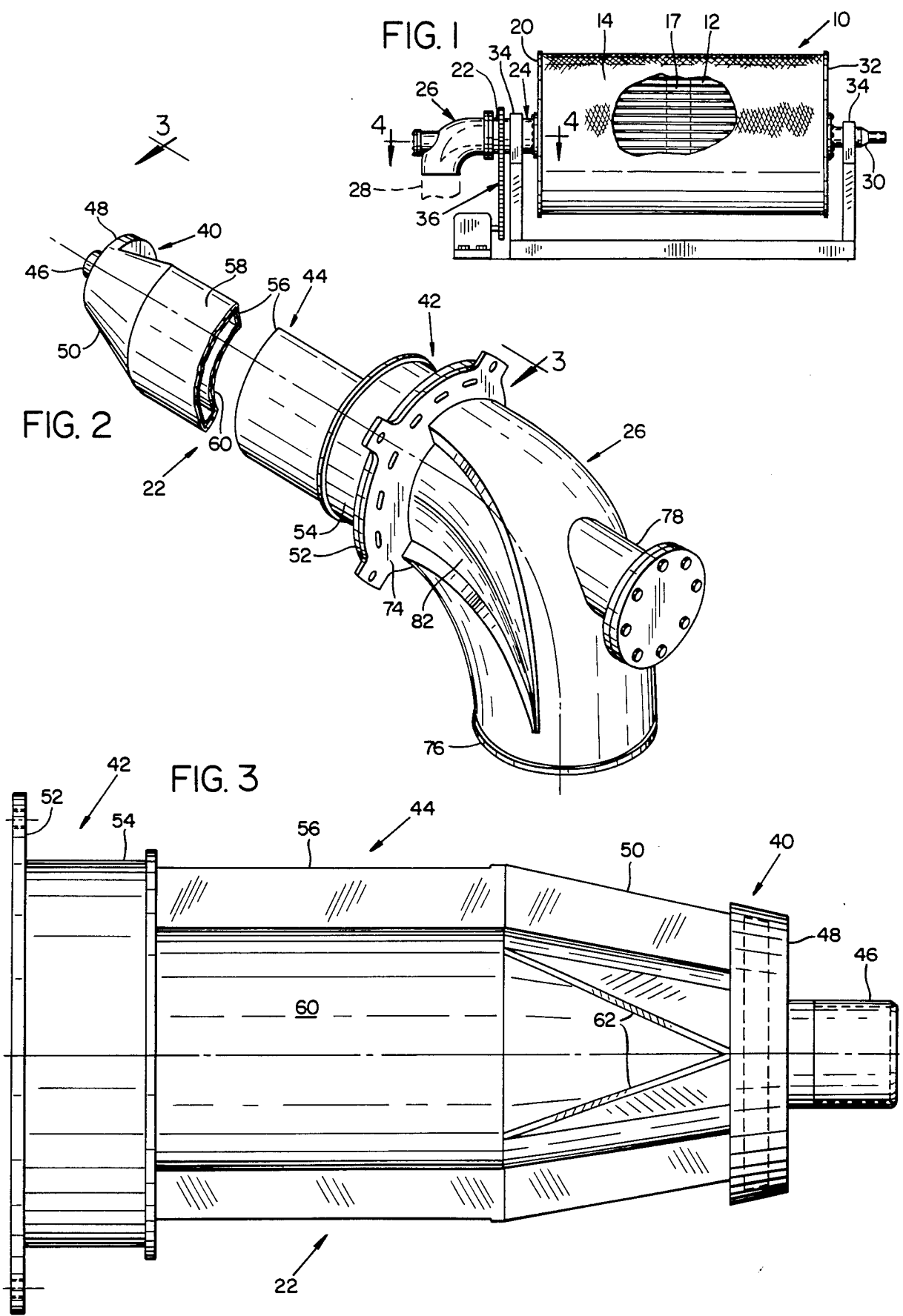

4,683,059

VACUUM BREAKER VALVE-DISCHARGE ELBOW ASSEMBLY FOR ROTARY DRUM FILTERS

BACKGROUND OF THE INVENTION

The present invention relates to rotary drum filters used in the pulp and papermaking industry to form a mat of wood pulp and separate the mat from its filtrate. The invention relates especially to such filters of the pipe machine type in which there is a suction control valve located centrally of one end of the drum filter for controlling the application of suction to the filter surface and the drawing of filtrate from the mat and drum. More specifically, the invention relates to an improved stationary suction valve and discharge elbow assembly for such a filter.

A drum filter of the pipe machine type comprises a rotary drum partially submerged in a tank of pulp slurry. Typically, the drum has axially extending filtrate channels spaced about its peripheral surface defined by ribs and covered by a filter screen. The surface filtrate channels communicate with an external source of subatmospheric pressure, or suction, through drainage pipes, an annular valve housing mounted centrally within the discharge end of the drum, a stationary valve member seated within the valve housing and extending therefrom, and a discharge elbow connected to the outlet end of the valve member. The stationary valve member has a valve closure segment which blocks off a section of multiple discharge ports in the valve housing to control the application of subatmospheric pressure to the connected drainage pipes and surface filtrate channels. As the drum rotates about its axis with suction applied, the screen rotates through the pulp slurry and collects a wet mat or "cake" of fibres from the slurry. As the screen emerges from the tank, filtrate is drawn from the mat through the screen and filtrate channels into the drainage pipes, and from there through the valve housing and into the valve member and discharge elbow to removethe filtrate from the drum. During rotation of the drum, the stationary valve closure segment cuts off suction to the filtrate channels in a segment of the drum surface, thereby enabling removal of the pulp mat from the screen surface, usually with the aid of a doctor device.

Rotary drum filters of the described pipe machine type are shown, for example, in U.S. Pat. No. 3,363,774 to Luthi and U.S. Pat. No. 4,383,877 to LaValley. Typically, the stationary valve member for such a drum filter, partially shown in FIG. 7 of the Luthi patent, has a cylindrical valve plug at its inlet end which is seated within the valve housing. A conically tapered valve closure segment extends rearwardly from the plug to cover a portion of the valve housing outlet ports to block them from the source of suction. A large central shaft extends rearwardly from the plug and outwardly beyond the discharge end of the drum, connecting with an annular flange and sealing rim at the outlet end of the valve member, such outlet end portion not being shown in the Luthi patent. Usually, a generally cylindrical drum trunnion connected to the drum surrounds the shaft portion of the valve member to define a portion of the filtrate discharge passage leading from the drum. The outlet end of the valve member joins an inlet end of the discharge elbow. The outlet end of the elbow, in turn, connects to a suction pipe leading to the source of subatmospheric pressure. The typical discharge elbow, shown at 30 and 31 in FIG. 2 of the Luthi patent, defines a flow passage having a sharp right angle turn. This abrupt change of direction at the elbow corner creates substantial head loss at this point, reducing substantially the suction available at the filtrate channels.

The design of the described valve member creates additional head loss problems. Because of the large central shaft of the valve member, there is an abrupt increase in the cross sectional area of the discharge flow passage at the intersection of the valve member and discharge elbow, which creates additional head loss. Many valve members also include internal reinforcing struts or webs extending between the shaft and valve segment and between the shaft and sealing rim. These create obstructions and therefore turbulence in the flow passage, and abrupt changes in cross sectional area of the passage, further contributing to the head loss problem at the valve-discharge elbow assembly.

Excessive head loss between the source of suction and the filtrate channels at the surface of the drum is a contributing cause to inadequate dewatering of the pulp mat, poor drainage of the filtrate channels, and undesirable rewetting of the mat as the drum rotates downward to its mat removal position. Accordingly, there is a need for an improved valve-discharge elbow assembly which will reduce head loss in these sections of the filtrate discharge flow passage from the drum.

The principal objective of the present invention, therefore, is to reduce head loss between the source of subatmospheric pressure and the filtrate channels of a rotary drum filter of the pipe machine type through elimination of abrupt changes in direction and cross sectional area of the discharge flow passage, and through elimination of obstructions in such flow passage, all in the valve and discharge elbow portions of the filter drainage system.

SUMMARY OF THE INVENTION

The present invention comprises a vacuum breaker valve-discharge elbow assembly for rotary drum filters of the pipe machine type which defines a filtrate discharge flow passage which is relatively free of internal obstruction, has only gradual changes in cross sectional area and only smoothly curved changes in direction.

According to a preferred embodiment of the invention, the conventional central shaft of the valve member is eliminated, and an extension segment which is a rearward continuation of the valve closure segment connects the valve plug and valve segment to the annular outlet portion of the valve member, whereby the valve segment and extension segment define a portion of the flow passage.

The invention may include a discharge elbow which defines a smoothly curving change of direction of the flow passage.

The invention may also include a discharge elbow having an inlet end within which the flow passage cross section is of substantially the same area as the flow passage cross section at the discharge end of the valve member, with the flow passage cross section gradually increasing in a direction toward the outlet end of the discharge elbow.

The invention may also include a valve member in which the extension segment is the only structural interconnection between the valve closure segment and the annular outlet end portion of the valve member.

The invention also comprises a valve member including a valve body which includes a valve plug at an inlet end of the body and an annular valve outlet end portion, with the valve plug and outlet end portions being interconnected by a tapered valve closure segment and an extension segment forming a rearward continuation of the valve closure segment.

The interior surfaces of the valve body may be lined with a corrosion-resistant, fiberglass-reinforced plastic, and the extension segment may be the only structural means interconnecting the valve segment with the outlet end portion.

The invention also comprises a discharge elbow defining a flow path which curves smoothly from the inlet end to the outlet end of the elbow. The elbow may include a continuation of the extension segment into the inlet end of the elbow, with such continuation gradually diminishing in size to gradually increase the cross-sectional area of the flow path in a downstream direction within the elbow.

The discharge elbow may also include a gradual transition from a segmented non-circular shape at its inlet end to a full circular shape in a direction toward the outlet end of the elbow.

The invention also comprises a rotary drum filter of the pipe machine type in which the valve member and discharge elbow for the filter define a discharge flow passage with only gradual transitions in cross sectional area, substantially no internal obstructions, and only smoothly curved changes in direction.

BRIEF DESCRIPTION OF DRAWINGS

In the drawings:

FIG. 1 is a schematic side elevational view of a rotary drum filter of the pipe machine type with a surface portion broken away to reveal deck structure of the machine;

FIG. 2 is a perspective view of the vacuum breaker valve-discharge elbow assembly portion of the filter of FIG. 1;

FIG. 3 is a side elevational view of the vacuum breaker valve member as viewed from the line 3—3 of FIG. 2;

DETAILED DESCRIPTION OF A PREFERRED EMBODIMENT

General Arrangement

Figure 4:
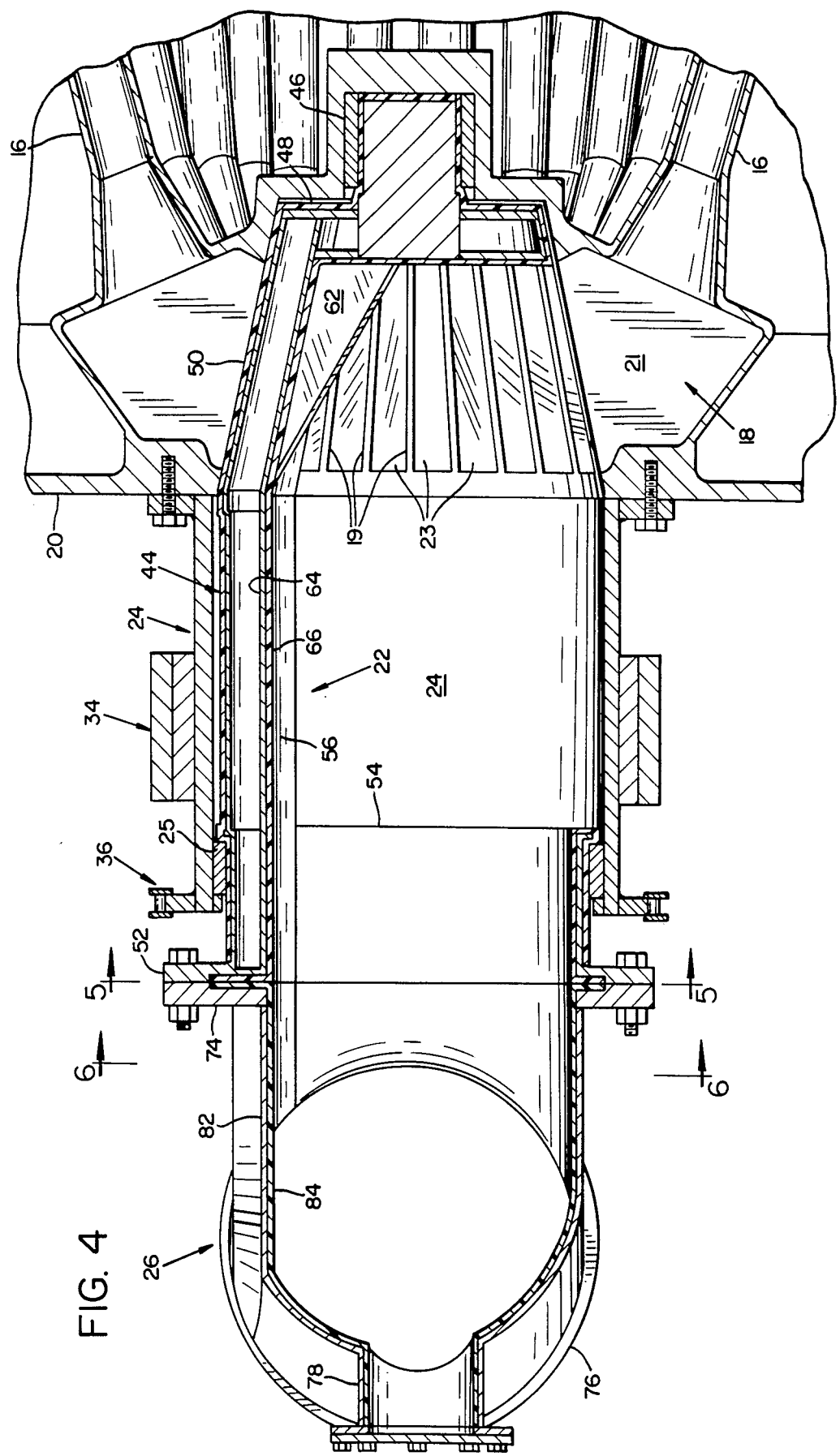
FIG. 4 is a horizontal sectional view taken along the line 4—4 of FIG. 1 showing the valve end portion of the drum filter.

With reference to FIGS. 1-3 of the drawings, a rotary drum filter 10 of the pipe machine type includes a cylindrical surface with longitudinally extending filtrate channels 12 covered with a filter screen 14. The filtrate channels drain into various drainage pipes 16 which lead from intake openings 17 at a central portion of the cylindrical surface to an annular valve housing 18 at a head or discharge end 20 of the drum. A stationary valve member 22 extends into the valve housing 18 through a rotary trunnion tube 24 connected to head end 20 of the drum. Stationary valve member 22 in turn joins a discharge elbow 26 which is connected at its downstream end to a suction pipe 28 leading to a source of subatmospheric pressure (not shown).

Trunnion tube 24 and a tail shaft 30 at the tail end 32 of the drum rotatably support the drum for rotation about its axis on drum support bearing members 34. The drum is rotated about its axis through an appropriate drive, such as the chain and sprocket drive 36 drivingly connected to trunnion tube 24.

Annular valve housing 18 is partitioned by radially extending ribs 19 into chambers 21 which communicate with the drainage pipes 16 and define outlet ports 23 for discharging filtrate from the drum. Filtrate leaves the drum through trunnion tube 24 and valve member 22 partially surrounded by such tube, and discharge elbow 26. These same elements communicate subatmospheric pressure from the source to the drum surface filtrate channels 12 as permitted by the valve member.

The rotary drum filter of the pipe machine type described thus far is substantially conventional. The uniqueness of the filter lies in the construction of the interconnected valve member 22 and discharge elbow 26, which will now be described in greater detail.

Vacuum Breaker Valve

Valve member 22 comprises a unitary valve body. The body includes an inlet end portion 40 which seats within valve housing 18, an annular outlet end portion 42, and an intermediate portion 44 which normally extends within trunnion tube 24 and interconnects the inlet and outlet portions.

Inlet end portion 40 includes a bushing 46 which rotatably supports the valve body within the valve housing and projects forwardly from a cylindrical valve plug 48. A conically tapered valve closure segment 50 extends rearwardly from plug 48. Segment 50 is sized and shaped to fit closely within the conical valve housing space defined by the radially inner edges of the valve housing ribs 19 to block off a selected segment of the valve ports 23 defined by such ribs. More specifically, valve closure segment 50 as shown defines a segment of a conical tube, for both its interior and exterior surfaces are conically tapered.

Annular outlet end portion 42 of the valve body includes an annular connecting flange 52 for connecting the valve member to the discharge elbow 26. Such outlet portion also includes an annular sealing rim 54 having a cylindrical exterior surface. This surface cooperates with an overlapping sealing surface of trunnion tube 24 and conventional sealing means 25 therebetween to form a fluid seal between the stationary sealing rim and the rotating trunnion tube.

Figure 5:
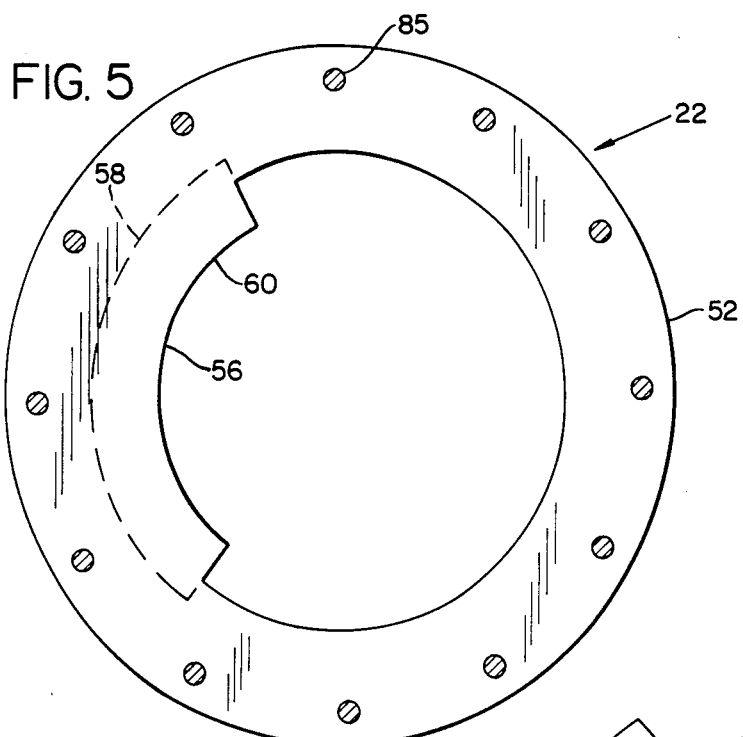
FIG. 5 is an outlet end view of the breaker valve member taken along the line 5—5 of FIG. 4.

Intermediate portion 44 of the valve body comprises a cylindrically curved extension segment 56 which forms a rearward continuation of the valve closure segment 50. The extension segment structurally interconnects the valve closure segment and the annular outlet end portion 42 of the valve body. In fact, the extension segment 56 is the only structural interconnection between the inlet end and outlet end portions of the valve body. Both the exterior surface 58 and the interior surface 60 of the extension segment are cylindrically curved. It will be apparent therefore, especially from FIG. 3, that the interior surface of the extension segment cooperates with a portion of the interior surface of the surrounding trunnion tube to define a major portion of the filtrate discharge flow passage through the valve body. It will also be apparent, especially from FIG. 5, that the cross sectional shape of the flow passage through the valve body will be generally that of a segmented circle; that is, a first portion of the cross section greater than 180° defines a circular arc, whereas a second portion of less than 180° also defines a circular arc, but of lesser radius than the first portion.

The cross sectional area of the flow passage through the valve body becomes gradually and progressively larger from the plug end of the body through the valve closure segment, and then remains substantially constant to the outlet end of the body, with no substantial interior obstruction of such passage. The described segmented circular cross sectional shape of the flow passage through the valve body remains substantially the same throughout its length, as will be apparent from FIG. 5. There it is shown that the extension segment 56 extends continuously from its juncture with the valve closure segment 50 to the outlet end flange 52, thereby serving as a structural support for the sealing rim and outlet end flange. A pair of gussets 62, shown in FIGS. 3 and 4, extend between and interconnect the closure segment and valve plug 48 to reinforce the connection therebetween, but without creating any substantial obstruction in the flow passage.

The valve body may also be provided with the usual mounting skid (not shown) suspended beneath the extension section and lifting eyes (not shown) for use in installing the valve body in the valve housing and trunnion tube.

The valve body is preferably fabricated of steel plate 64 to form a hollow valve closure segment, extension segment, and valve plug, but solid outlet flange, sealing rim and bushing. The bushing may be lined with stainless steel for corrosion and wear resistance. The interior and exterior surfaces of the inlet, outlet, and intermediate portions of the valve body are preferably provided with a fiberglass-reinforced plastic lining 66 for corrosion resistance.

Although the bushing 46 is shown as a solid shaft, it might also be in the form of a hollow socket for receiving a corresponding shaft in the valve housing, depending on whether the bearing surface of the valve housing is in the form of a socket or a shaft.

Discharge Elbow

Discharge elbow 26 defines a continuation of the flow passage defined by the valve body. The discharge elbow includes an inlet end connecting flange 74 for connection to the outlet end flange 52 of the valve body and a rimmed outlet end 76 which would normally be received within the inlet end of suction tube 28 (FIG. 1).

Inlet end 74 of the elbow lies in a plane which intersects the plane of the outlet end 76. More particularly, in the illustrated embodiment these planes intersect at right angles, the elbow forming a 90° bend. However, unlike prior discharge elbows, the elbow shown curves smoothly from its horizontally directed inlet to its vertically directed outlet, forming a smoothly curving flow passage to minimize turbulence and energy loss within the elbow. The elbow is also provided with an inspection port extension 78. The usual vacuum fitting (not shown) could also be provided for attachment of a vacuum gauge, if desired.

Unique features of the discharge elbow are the cross sectional area and shape of the flow passage which it defines. More specifically, the elbow, beginning at its inlet end flange, has a recessed outer side surface portion 82 conforming to the cross sectional shape of the valve extension segment 56 but becoming gradually shallower and less pronounced in a direction toward outlet end 76. Recessed exterior surface 82 forms a corresponding interior surface 84 (FIG. 6) such that the flow passage at the inlet end of the elbow has the same segmented cross sectional shape and same area as the flow passage at the outlet end of the valve member. However, in the downstream direction within the elbow, the cylindrical segment defined by the recess becomes progressively less pronounced, whereby there is a gradual transition of the cross sectional shape of the flow passage from that of a segmented circle to that of a full circle at the outlet 76. It will be apparent, therefore, that the cross sectional area of the flow passage in the discharge elbow gradually and progressively increases from the inlet end toward the outlet end. Moreover, the cross sectional area of the flow passage at the outlet end of the valve is the same as its area at the inlet end of the elbow. This feature ensures that there is no abrupt change in cross sectional area of the flow path from the valve member to the elbow which could cause substantial head loss at this point. Moreover, the smoothly curving elbow minimizes head loss as the flow path changes direction in the elbow.

If desired, the segmented circular shape of the flow passage within the elbow could be provided by an internal extension segment similar to the valve extension segment and forming a continuation of the latter. In such case, the external surface recess of the elbow could be eliminated.

Figure 6:
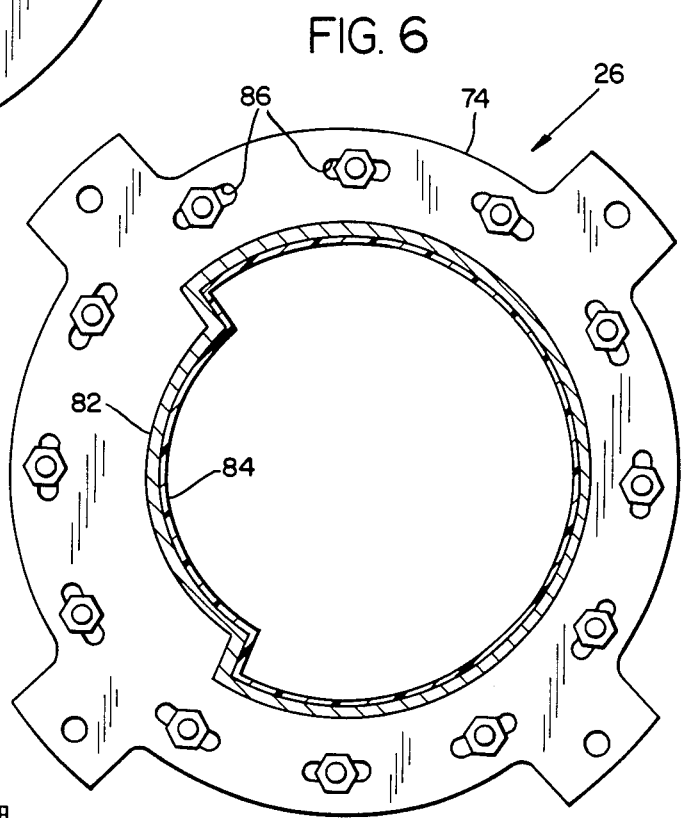
FIG. 6 is a cross sectional view of the discharge elbow taken along the line 6—6 of FIG. 4.
Figure 7:
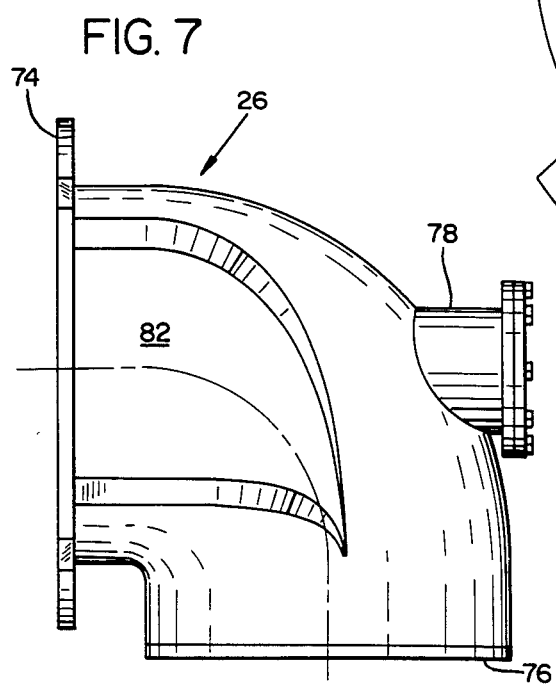
FIG. 7 is a side elevational view of the discharge elbow of FIG. 2.

Referring to FIG. 6, the inlet end flange 74 of the elbow includes circumferentially elongated bolt slots 86 which are spaced to register with bolt holes 85 in the outlet end flange 52 of the valve member for bolting the two flanges together. The slots 86 permit some angular adjustment of the elbow relative to the valve member to enable precise alignment of the elbow segment 84 with valve extension segment 56. Such slots also enable angular adjustment of the valve closure segment 50 relative to the outlet ports of valve housing 18. As with the valve body, the internal surfaces of the elbow are lined with fiberglass reinforced plastic to resist corrosion.

Operation

With reference especially to FIGS. 1, 2 and 4, as the drum filter rotates, suction is applied through the discharge elbow and valve body to the valve housing, and thus through the drainage pipes to the filtrate channels at the surface of the drum filter. As this occurs, the smooth curve of the elbow and the gradual changes in cross sectional area of the flow passage defined by the elbow and valve body produce only minimal turbulence and head loss. Consequently, the suction is applied efficiently and with minimum head loss to the filtrate channels, and the filtrate is drawn efficiently from the drum through the elbow and valve discharge passages, enhancing the effective operation of the drum filter.

Having illustrated and described the principles of my invention by what is presently a preferred embodiment thereof, it should be apparent to persons skilled in the art that the same may be modified in arrangement and detail without departing from such principles. I claim as my invention the preferred embodiment and all modifications and equivalents thereof coming within the true spirit and scope of the following claims.

I claim:

1. In a rotary drum filter of the type in which internal drainage pipes deliver filtrate from filtrate channels at the drum surface to chambers of an axial valve housing at one end of the drum, with the chambers of the valve housing delivering the filtrate into a stationary valve-discharge elbow assembly for discharge from the drum, all under the influence of suction applied from a remote source of subatmospheric pressure through said discharge elbow, said vlave-discharge elbow assembly comprising:

a valve member including an inlet end for insertion within the valve housing of a rotary drum filter and an outlet end, the valve member defining with rotary portions of the drum a filtrate flow passage, a discharge elbow including an inlet end connected to the outlet end of said valve member and an outlet end, the discharge elbow defining a continuation of said filtrate flow passage, said continuation curving smoothly from the inlet end to the outlet end of the elbow, the inlet end of the valve member including a valve end plug and a valve closure segment extending rearwardly of said plug for overlying a portion of the chambers of a valve housing at any given time to block such portion from a source of subatmospheric pressure;

the outlet end of the valve member including an annular outlet portion connected to the discharge elbow and spaced from the valve segment, and an extension segment extending rearwardly from the valve segment and interconnecting said valve segment and said annular outlet portion, whereby the cross sectional shape of the filtrate flow passage throughout at least a substantial portion of the length of the valve member is determined by said valve segment and said extension segment.

2. An assembly according to claim 1 wherein said extension segment extends from said valve segment through said annular portion to an outlet end connecting flange of the valve member.

3. An assembly according to claim 2 in which the cross sectional shape of the flow passage continuation defined by the inlet end of said discharge elbow corresponds to the cross sectional shape of the flow passage defined by the outlet end of said valve member.

4. An assembly according to claim 3 wherein the discharge elbow defines a gradual transition in flow passage cross section from its inlet end toward its outlet end, whereby the cross section of said flow passage changes gradually from a partially circular segmented shape at its inlet end to a fully circular shape toward its outlet end.

5. An assembly according to claim 2 wherein said discharge elbow includes a continuation of the extension segment, said continuation gradually diminishing in size from the inlet end downstream in said elbow, whereby there is a gradual transition in the shape of the flow passage within said elbow from noncircular to circular.

6. An assembly according to claim 1 wherein the cross sectional shape of the filtrate flow passage is substantially similar from the inlet end to the outlet end of the valve member.

7. An assembly according to claim 1 wherein said extension segment is the only interconnection between said valve segment and said annular outlet portion.

8. An assembly according to claim 1 wherein said segment has a conical taper complementary to the conically tapered interior space defined by the valve housing with which the valve segment cooperates, and said segment defines a segment of a cylinder.

9. An assembly according to claim 1 in which said valve segment and said extension segment have inner fluid-confronting surfaces which curve circumferentially of the valve member.

10. An assembly according to claim 1 wherein the interior of said flow passage and continuation thereof are substantially unobstructed from the inlet end of said valve member to the outlet end of said discharge elbow.

11. An assembly according to claim 1 wherein the cross sectional area of the flow passage increases gradually from the inlet end plug to said extension segment, remains substantially constant throughout the length of said extension segment, and increases gradually from the intersection of said valve member and discharge elbow in a direction toward the outlet end of said elbow, whereby there are no abrupt changes in cross sectional area of the flow passage from the inlet end of the valve member to the outlet end of the elbow.

12. An assembly according to claim 1, wherein the cross-sectional area of the flow passage changes only gradually between the inlet end plug and outlet end of said elbow.

13. In a rotary drum filter of the type having a stationary valve member for controlling the discharge of filtrate through an axial valve housing at the discharge end of said rotary drum filter and into a discharge elbow at such end and the application of suction from a remote source through the elbow and housing to filtrate channels at the surface of the drum, said valve member comprising:

an elongate valve body including an inlet end for insertion in a valve housing and an outlet end for connection to a discharge elbow spaced outwardly of the housing, said inlet end including a cylindrical valve plug including bearing means for seating the valve member within the valve housing, said outlet end including an annular valve outlet portion, a valve segment extending rearwardly from said plug for blocking a selected portion of the valve outlet ports of the valve housing from a source of suction during rotation of the drum, said segment having a conical exterior surface corresponding to the conical shape of an interior space of the housing, and an extension segment structurally interconnecting said valve segment and said annular valve outlet portion, said extension segment comprising a rearward continuation of said valve segment.

14. The apparatus according to claim 13 wherein said valve segment comprises a segment of a conical tube and said extension segment comprises a segment of a cylindrical tube.

15. The apparatus according to claim 13 wherein said valve segment and said extension segment are of substantially the same thickness.

16. The apparatus according to claim 13 wherein said valve segment and said extension segment define arcuate segments of substantially the same angular magnitude.

17. The apparatus according to claim 16 wherein said annular magnitude is between 100 and 150 degrees.

18. The apparatus according to claim 13 wherein said annular outlet portion includes an annular connecting flange at said outlet end for connection to a discharge elbow and an annular sealing rim extending from said flange toward the inlet end, said extension segment extending past said sealing rim to said connecting flange.

19. The apparatus according to claim 13 wherein the interior surfaces of said valve plug, valve segment, extension segment and annular outlet portion are lined with fiberglass reinforced plastic for corrosion resistance.

20. The apparatus according to claim 13 wherein said extension segment is the only interconnection between said valve segment and said annular outlet portion.

21. In a rotary drum filter of the type having a stationary discharge elbow for connection to an axial end valve portion of said rotary drum filter for use in applying subatmospheric pressure to the filter and drawing filtrate from the drum, said discharge elbow comprising:
an elbow body defining a flow passage and having an inlet end and an outlet end, with the inlet and outlet ends lying in intersecting planes,
said flow passage curving smoothly between said inlet and outlet ends to minimize turbulence and energy loss and changing gradually and progressively from a noncircular cross sectional shape to a circular cross sectional shape in a direction from said inlet end toward said outer end,
the cross sectional area of said flow passage changing gradually from said inlet end in a direction toward said outlet end.

22. The apparatus according to claim 21 wherein said planes intersect at right angles.

23. The apparatus according to claim 21 wherein the noncircular cross sectional shape at said inlet end includes a first portion describing a circular arc of greater than 180° and a second portion describing a circular arc of less than 180° and of lesser radius than said first portion.

24. The apparatus according to claim 21 wherein the cross-sectional area of said flow passage increases gradually from said inlet end in a direction toward such outlet end.

25. In a rotary drum filter having longitudinal surface filtrate channels covered by a filter screen, internal drainage pipes for delivering filtrate from the filtrate channels to an annular valve housing within an end of the drum, the valve housing being radially partitioned to define filtrate outlet ports surrounding a central valve space, a stationary valve member extending into the valve space and including a valve closure segment blocking a portion of the outlet ports during rotation of the drum to cut off communication between the filtrate channels and an external source of suction, and a discharge elbow connected to the downstream end of the valve member and defining with the valve member and a drum end portion, a filtrate discharge flow passage from the drum,
said valve member being characterized by an extension segment forming a rearward continuation of said valve segment and structurally interconnecting the valve segment and an outlet end of the valve member.

26. In a rotary drum filter according to claim 25,
said discharge elbow being characterized by a continuation of said extension segment of the valve member, with said continuation gradually diminishing in size from the inlet end of said elbow downstream, whereby the portion of said discharge flow passage defined by said elbow gradually increases in cross sectional area in the downstream direction.

27. In a rotary drum filter according to claim 26, said discharge elbow being characterized by defining a discharge flow passage portion having a smoothly curved 90° turn and a cross sectional area at its inlet end which is substantially the same as the cross sectional area of the discharge flow passage at the outlet end of the valve member.

28. In a rotary drum filter according to claim 25, said valve member being characterized by only gradual changes in the cross-sectional area of the flow path between an inlet end of the valve member at said valve segment and the outlet end of the valve member.

29. In a rotary drum filter according to claim 25,
said discharge elbow being characterized by a continuation of said extension segment of the valve member, with said continuation gradually changing in size from the inlet end of said elbow downstream, whereby the portion of said discharge flow passage defined by said elbow gradually changes in cross-sectional area in the downstream direction.

30. In a rotary drum filter according to claim 29,
said discharge elbow being characterized by defining a discharge flow passage portion having a smoothly curving 90° turn and a cross-sectional area at its inlet end which is substantially the same as the cross-sectional area of the discharge flow passage at the outlet end of the valve member.

* * * * *